United States Patent [19]

Voigt

[11] 4,438,485
[45] Mar. 20, 1984

[54] EFFICIENCY SWITCHING-MODE POWER SUPPLY

[76] Inventor: William C. Voigt, 1970 Harrison St., San Francisco, Calif. 94103

[21] Appl. No.: 332,449

[22] Filed: Dec. 21, 1981

[51] Int. Cl.³ ............................................ H02M 3/335
[52] U.S. Cl. ........................................................ 363/21
[58] Field of Search .................................... 363/18–21, 363/97

[56] References Cited

U.S. PATENT DOCUMENTS

| | | | |
|---|---|---|---|
| 3,514,688 | 5/1970 | Martin | 363/20 X |
| 3,523,235 | 8/1970 | Schaefer | 363/19 |
| 4,301,497 | 11/1981 | Johari | 363/21 |
| 4,347,559 | 8/1982 | Sturgeon | 363/21 |
| 4,355,277 | 10/1982 | Davis et al. | 363/21 X |

OTHER PUBLICATIONS

IBM Technical Disclosure Bulletin, "Power Supply with Optical Isolator", A. J. Bowen, G. M. Heiling, L. T. Lemke, vol. 14, No. 11, Apr. 1972.
IBM Technical Disclosure Bulletin, "Flyback Converter System", R. P. Rizzo, vol. 23, No. 8, Jan. 1981.

Primary Examiner—William M. Shoop
Attorney, Agent, or Firm—Michael L. Harrison

[57] ABSTRACT

A switching-mode, blocking oscillator based power supply employs proportional base drive and an improved design of rise-time suppression to improve effeciency and reliability. Current limiting elements cooperate with pass transistor control circuits to provide abrupt and power-efficient primary circuit switching.

10 Claims, 5 Drawing Figures

EFFICIENCY SWITCHING-MODE POWER SUPPLY

BACKGROUND OF THE INVENTION

1. Field of the Invention

The present invention and the invention described in copending application Ser. No. 330,616 filed on Dec. 14, 1981, relate to the field of electronic, switching-mode power supplies and, in particular, to regulator circuits for electronic switching-mode power supplies employing blocking oscillators.

2. Prior Art

The use of switching elements in electronic power supplies is well known in the present state of the art. The advantages of such power supplies include higher efficiency, lower weight and smaller size in comparison to analog power supplies. At some power levels, switching-mode power supplies are even less costly than their analog counterparts.

The size and weight advantages of switching-mode power supplies are achieved by operating their transformers and other magnetic components at high frequencies. In a conventional power supply, the transformer is operated directly from the main power source and, accordingly, is operated at the frequency of the power source.

The size advantages of commercial switching-mode power supplies results from the operation of the power transformers at a frequency well above that of standard power line frequencies. In fact, it is usually well into the high audio frequency or ultrasonic frequency range. Dramatic miniaturization is thus achieved, albeit at the expense of somewhat greater circuit complexity.

For the same power levels, a conventional transformer will vary in size approximately inversely with frequency. As frequencies become higher and higher, cores having suitable core loss characteristics cause the relationship to become less favorable since the so-called "low-loss" materials may have low maximum flux density capabilities. Thus, the core size itself will be larger than would be predicted if a change in core material was not required. Nonetheless, transformers having extraordinarily high volt-amp ratings per unit volume, are made possible by operation at the high frequencies possible with switching-mode circuitry.

Because the switching-mode power supply is lightweight and has such superior compactness, it has become more and more the circuit of choice for small, semi-portable equipment. In fact, the use of switching-mode supplies is now being seen in applications which were once thought to be the exclusive domain of analog supplies such as in small digital computers, in particular those intended for small business applications, where compactness is considered an important attribute for ease of installation in an office environment.

The conventional approach to design of switching-mode power supplies has been to employ a magnetically-coupled multivibrator which uses a pair of high-efficiency, solid-state switches, each alternately switching one-half of a center-tapped transformer primary to cause a square-wave having peak voltage equal to twice the center-tap voltage to appear across the entire primary. On alternate half-cycles, the primary current flows first in one side of the primary through the switch which is on, then through the other side of the primary and its associated switch, each for one-half of the period of the supplier basis operating frequency.

The square-wave is then stepped up or down by appropriate secondary windings and, usually, rectified and filtered for supply to a direct-current load.

Regulation of the output may be achieved, if desired by either a dissipative regulator or a switching-mode regulator. The series-pass transistor for the regulator may be located in either the primary or the secondary side of the transformer. For regulation of an output voltage which is lower than the input voltage, the most efficient choice is usually to locate the pass transistor in the primary side and to close the feedback loop aroung the transformer and rectifier/filter combination.

Although the magnetically-coupled multi-vibrator is a straightforward and relatively power efficient circuit which is unaffected by wide ranges of load variation, it is also relatively expensive due to the need for the three power semiconductors, two of which are required for the functions of chopping and one of which is required for the function of regulating the input direct current. Indeed, for certain applications, line-voltage and power levels would require transistor specifications which are beyond the state of the art. For the highest possible voltage, at the minimum, a "bridge" primary switch is required, at approximately twice the complexity of the standard design. In addition, the regulator control circuitry for the standard regulated DC-DC converter is at least as complicated and expensive as its analog counterpart.

The search for more cost-effective ways to achieve a regulated switching-mode power supply has led to the adoption in recent years of the blocking oscillator and its variants as the basic power converter design. Although somewhat touchy in terms of start-up and wide load-range operation, the blocking oscillator is a highly efficient circuit both in terms of its power processing efficiency and its parts cost. Instead of a pair of switching transistors and a series-pass transistor, the blocking oscillator-based power supply requires but a single switching transistor which can be made to perform the functions of both chopping the unregulated direct current supplied to the input, and regulating the voltage produced at the output.

In addition to the reduction in parts count, the blocking oscillator-based power supply can be rendered in a design which does not require the switching transistors to see twice the input voltage, as does the standard DC-DC converter. Instead the power switch sees a theoretical maximum voltage of significantly less than twice the input voltage, depending upon the duty cycle which is chosen for its operation. Thus, operation of the supply directly from a 220 volt rectified main power source is possible, even using currently available semiconductor devices.

The desire for higher and higher efficiencies has led to the development of subtle circuit refinements, which allow the blocking oscillator to operate reliably over wider ranges of input voltage and load voltage. Nonetheless, there are areas within the circuit which are wasteful of power and can still be improved by further refinement, namely in the areas of reducing excessive base drive and providing a reliable current-limit point for controlling the pass-transistor characteristics during overload fault and during turn-on, and power-official load like control so that the main power switch always remains within the safe-operating area of its specifications.

In the past, safe operating area operation has been assured by providing a capacitor bypass, or "snubber", for current flow during the fall time of the power switch, so that the switch itself can be turned off sufficiently to avoid instantaneous peaks of high-current and high-voltage during turn-off, a potentially catastrophic condition. However, the current which flows during the fall time can be advantageously used to improve operation of the auxiliary current-limit circuitry. Past current limiter circuitry has been employed to prevent over-current conditions during turn-on and during load faults, but operation of simple versions of these circuits has been unpredictable due to the large variations in voltage sensing components which are employed thus causing unreliable predictions of the current limit point from unit to unit.

SUMMARY OF THE INVENTION

Accordingly, it is the object of the present invention to provide an improvement in blocking oscillator based power supplies in which the base drive is optimized to the load of the power supply so that optimum efficiency is the result.

It is another object of the present invention to provide an improvement in the load-line control circuitry so that the energy dissipation therein is converted to a useful purpose in aiding reliable current limiting in the primary.

The present invention provides these and other objects by providing a snubber circuit consisting of a series diode both of which are in series with the emitter of the main power switch transistor and through which the snubber capacitor can charge, and by providing a proportional base drive transformer which senses collector current flowing through the series pass transistor and provides a portion of said current to the base, in a fixed ratio so that as current in the collector increases, the current into the base increases proportionally. The proportional base drive is contained within the snubber circuit loop so that charging of the snubber capacitor does not fight turn-off of the pass transistor.

These and other improvements are described in the following specification and are shown in the drawings in which;

DESCRIPTION OF THE PREFERRED EMBODIMENT

General Description

Figure 1:
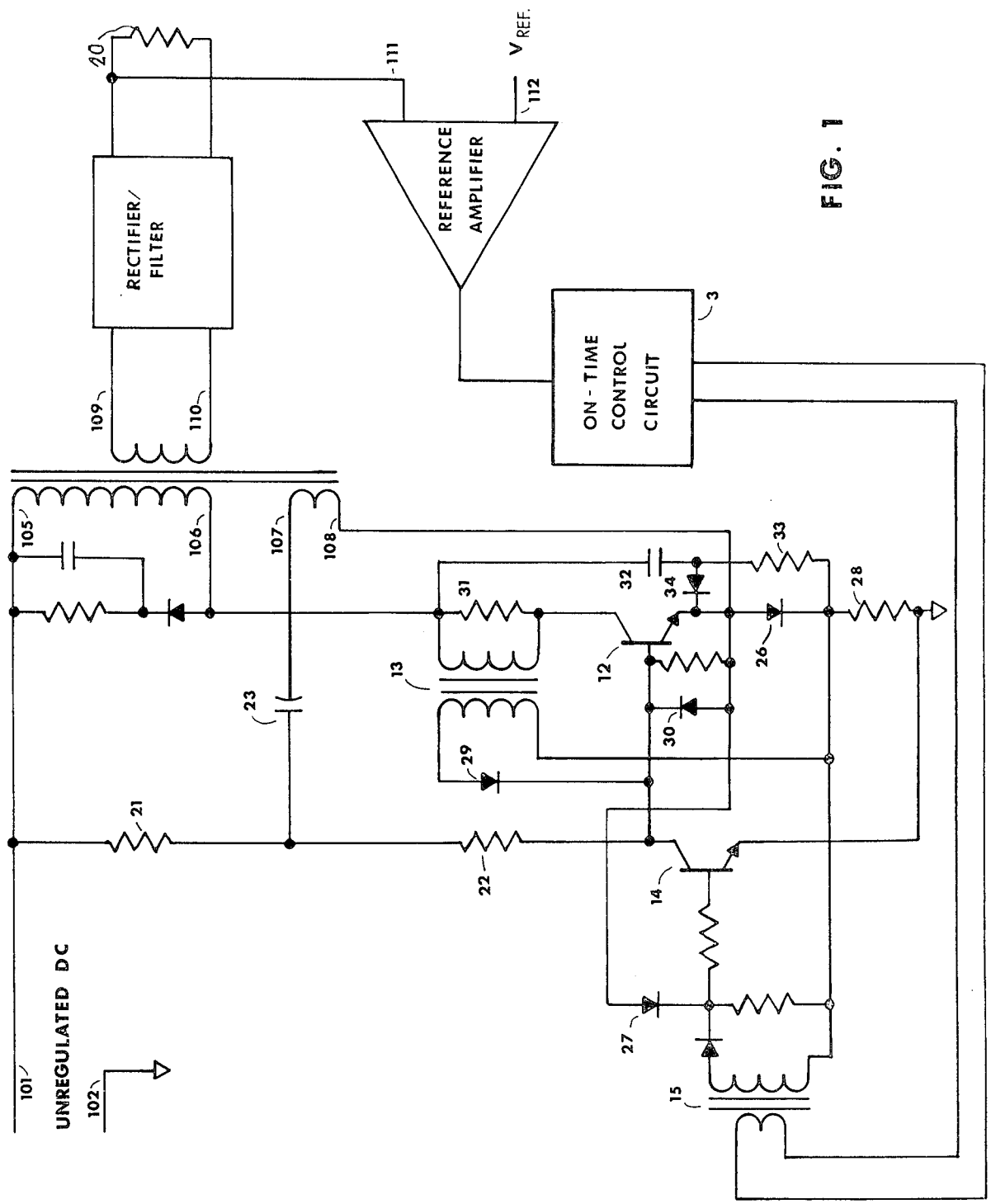
FIG. 1 is a simplified schematic diagram of a blocking oscillator based power supply in accordance with the present invention in which the primary circuitry is shown in detail.
Figure 2:
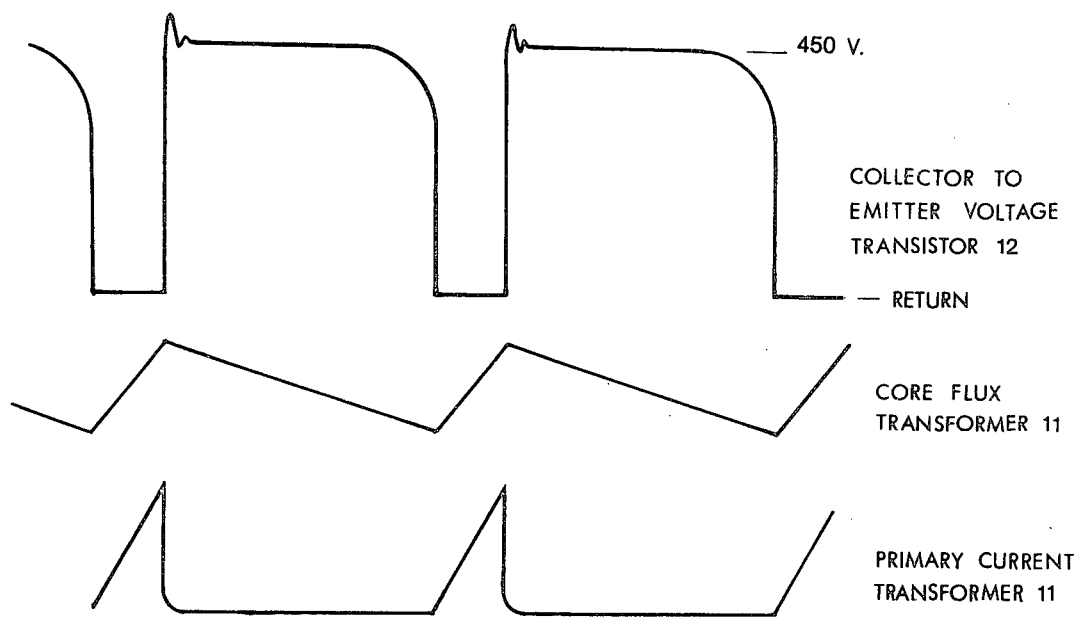
FIG. 2 is a diagram of the current and voltage waveforms of the circuit described in FIG. 1.

Referring now to FIG. 1 there is shown a blocking oscillator-based, switching-mode power supply in accordance with the present invention. Unregulated direct current from an external source is presented to the inputs of the power supply at 101 and 102. In a frequently employed embodiment, the direct current needed for operation of the supply and for processing for delivery to the load is provided by direct rectification and filtering of an AC main.

Current from the unregulated source is caused to flow through transformer 11 by means of alternately switching the solid state switch, transistor 12, ON and OFF.

Current builds in the primary inductance of transformer 11 until transistor 12 is turned "OFF". Upon turn-off, a path for primary current flows ceases causing the magnetic field produced by the primary to collapse, in turn causing a voltage opposite in sign to that originally impressed on the primary to appear across the primary coil. The phasing of secondary wndings, and the polarity of secondary rectifiers is chosen so that conduction in the secondary circuitry occurs only during the flyback time of the primary waveform. Thus, energy is stored in transformer 11's primary during the ON-time of transistor 12 and is transformed into the secondary of transformer 11 during the OFF-time of transistor 12.

On-time of transistor 12 is controlled by transistor 14 which is in turn controlled by transformer 15 and the regulator ON-time circuitry 3. Control of ON-time is provided in response to the output of reference amplifier 17 which is in turn responsive to the differential between a sample of the output voltage and a reference voltage presented to the comparator at inputs 111 and 112 respectively.

In most general terms, an increase in voltage at the load 20 results in an output from reference amplifier 17 which causes the ON-time control circuitry 3 to produce a pulse which is coupled through transformer 15 to transistor 14 and which in turn cuts off base drive to transistor 12. A reduction in load voltage causes the base drive to transistor 12 to be allowed to remain on for a longer period of time. Since the ON-time of transistor 12 controls the amount of energy stored in the primary inductance of transformer 11, it follows that the amount of such energy stored during each cycle is controlled by controlling the ON-time of transistor 12 in response to the output of reference amplifier 17.

Thus, by proportionately increasing or decreasing ON-time, in response to changes in the voltage appearing across load 20, it may be seen that the circuit regulates the output voltage, maintaining it within pre-established values. Since the main transformer 11 isolates the load from the line voltage, and since transformer 15 isolates the control feedback loop from the load, it may also be seen that the load can be referenced to any convenient point without regard for the reference of the input, and that the feedback loop nonetheless operates effectively around the power transformer 11. This allows operation of the power supply directly from a main power source without need for an intervening, bulky, line-frequency isolation transformer, since isolation of source and load is achieved by means of the high-frequency transformers 11 and 15.

Detailed Description of Operation

The circuit of FIG. 1 may now be evaluated in more detail with emphasis upon the features which comprise the present invention. Under initial start-up conditions, base drive is zero to both transistors 12 and 14, and current is now flowing through the collector circuit of either transistor. Unregulated direct current is applied to inputs 101 and 102, which initially causes current to flow in resistor 21, through resistor 22. The current flow through resistor 21 is initially into capacitor 23 which charges through winding 107/108 through diode 26 and resistor 28 until the voltage on the capacitor equals the threshold voltage of the base of transistor 12. At that point, current is diverted into the base and charge increase on capacitor 23 is stopped leaving a slight, approximately 0.7 V. charge on the capacitor. Resistor 21 is much higher in value than resistor 22 so that once circuit operation is established in steady state conditions, its effect is minimal.

The small initial current flow into the base of transistor 12 causes a higher magnitude current to begin to flow in the collector circuit of transistor 12 and through the primary windings 105/106 of transformer 11. As flux builds up in the core of the transformer, voltage is induced in a secondary winding 107/108 causing capacitor 23 to be charged in a reverse direction through the current loop consisting of resistor 22 and the base of transistor 12.

Since the current flowing into the base due to charging of capacitor 23 is in phase with the current provided by resistor 22, further conduction is possible through the collector circuit of transistor 12. Further increases in collector current in turn cause corresponding increases in the current through capacitor 23, which itself in turn regeneratively increases the conduction through the collector. When sufficient base current is provided to drive the collector of transistor 12 into saturation, the full available supply voltage is impressed across the primary winding of transformer 11 causing the full value of the secondary voltage of winding 107/108 to appear at capacitor 23. Capacitor 23 thus discharges through resistor 21 and the base of transistor 12 according to the time constant of the circuit, with an allowance being made for base-emitter voltage drop at transistor 12, a factor which is slightly influenced by the base current supplied from the proportional base drive circuitry described below.

When steady-state conditions are established, each cycle's base drive in initiated on a cycle by cycle basis through the action of winding 107/108, coupled through capacitor 23. Following the flyback time when the magnetic field stored in the primary of transformer 11 has collapsed to the point at which the secondary rectifiers have ceased conduction, the primary voltage drops to zero and rings negatively due to the resonance between the transformer primary inductance and snubber and stray capacitor, thereby again inducing a positive base-drive voltage at winding 107/108 which again drives transistor 12 into conduction thereby repeating the cycle.

During the ON portion of each cycle of operation, transistor 12 provides a path through which current can flow in the primary of transformer 12 as described above. The voltage impressed across the primary causes the current to increase in the primary of transformer 11 linearly at a rate determined by the value of the impressed voltage and the value of the primary inductance. The level to which the current is allowed to increase is determined by the ON-time of transistor 12, which in turn is determined by the ON-time control circuitry 16 in response to the sensed load requirements.

Regulation of the secondary output voltage is obtained by adjusting the level of the peak to which the current is allowed to build in the primary of transformer 11, by the expedient of reducing the ON time for transistor 12.

The energy which is temporarily stored in the primary of transformer 11 is proportional to the square of the current at any given time. The peak energy is therefore proportional to the square of the current at its peak. However, the current value itself increases linearly with respect to time from a value of zero, at the time of initial turn-on of the transistor 12, to its peak.

Since the flux linkages around transformer 11 are, in theory, constant, the volt-second integrals for the pulse waveform during the transistor 12 ON time, and the pulse waveform for the OFF time are equivalent, although opposite in sign. Thus, when the ON time of transistor 12 is reduced, the OFF time is reduced by a proportional amount. However, as noted above, the energy stored in the transformer for each pulse is proportional to the square of the peak current. Therefore, even though the value of the volt-second integrals must remain equal regardless of the operating frequency, the energy stored per pulse varies as the square of the ON time period thereby effecting overall a reduction in the rate of storage and dissipation of energy, i.e. the power processed through the transformer. The net effect is that as the load requirements change, the ON time of transistor 12 decreases as does the OFF-time by a proportional amount. This causes an increase in the pulse repetition rate of the oscillator. However, although the pulses are more frequent, each pulse's energy content is decreased by a ratio which is greater than the proportional increase in the number of pulses. Thus, by regulating the ON time of transistor 12, and indirectly regulating the frequency of the oscillator, the amount of power processed through transformer 11 can be controlled.

As the input line voltage changes, the time required to reach a given peak primary current is proportionally reduced. The ON time is therefore shortened and an increase in operating frequency results. An increase in operating frequency with all other factors remaining constant however, increase the energy flow from primary to secondary, thereby causing an increase in output voltage to the load. Accordingly to maintain a constant output voltage, the ON time must be further still reduced to the point at which the energy flow from primary is balanced by that required in the secondary. This adjustment of ON-time occurs automatically and smoothly by operation of the regulator circuitry.

Proportional Base Drive

Current for initiation of conduction and for a portion of the ON time base drive of the main power switch, transistor 12, is provided by resistor 22 and the charging of capacitor 23 as described above. To minimize base drive requirements and, accordingly, to minimize power consumed by the base drive circuit, the initial drive current into the base of transistor 12 is deliberately made small. However, as the flux increases in the core of transformer 11, the magnetizing current required in the primary of transformer 11 likewise increases causing a greater and greater base drive requirement to exist.

At the beginning of each ON period for transistor 12, the collector current is very small since the current build-up is impeded by the primary inductance of transformer 11. Current begins to build immediately however, at a rate determined by the value of the impressed voltage and the value of the primary inductance as described above. To support the current flow through transistor 12, the base current must equal the collector current divided by the minimum saturation current gain of transistor 12. Since the collector current varies however from zero to $I_{c\ (max)}$, the minimum base current requirement also varies. If the base current is designed to be equivalent to the maximum under all conditions, it will suffice for all conditions to maintain transistor 12 in saturation, of course, but for all other load conditions short of full-load and for all other times during the ON period prior to the collector current reaching $I_{c\ (max)}$ the base drive provided will be excessive.

To provide a maximum value of base drive during times when it is not required represents a large waste of power which, if recovered, improves the efficiency of the supply by reducing the "overhead" necessary to operate the power supply's own circuitry, and reduces the heat production of the supply which must be dissipated by the equipment in which it is installed.

The desire to reduce the overall base drive current required is reconciled with the need for increasing the base drive current required over the period of the ON time of transistor 12 by provision of a proportional base drive circuit consisting of resistor 31, transformer 13, and diode 29. As transistor 12 is initially turned "ON" and collector current begins to increase from a low value toward its maximum by the required base drive increases until, at the completion of the cycle, collector current is at a maximum and correspondingly the need for base current is also at a maximum. The primary of transformer 13 is in series with the collector of transistor 12 and the primary of transformer 11 and accordingly is a path for current flowing in that loop. This current is transformed through transformer 13 the secondary of which is in turn connected to the base circuit of transistor 12. As the collector current of transistor 12 increases, the base current therefore also increases. Thus, the base drive available from the secondary of transformer 13 linearly increases as the collector current linearly increases, so that the optimum ratio of base current to collector current is always maintained at all times during any given cycle and over wide range of load conditions. As a result, it will be apparent, an excess of base current is not required during those portions ot the cycle when the collector current is minimum.

An additional advantage to the proportional base drive circuit is found during turn-off of transistor 12. Since the base current is proportioned to the collector current, only the precise amount of base current required for the given operating conditions of transistor 12 must be shunted away through transistor 14. This further reduces the dissipation of the base drive available from transformer 13 immediately begins to drop upon the collector current for transistor 12 dropping, the turn-off for transistor 12 is regenerative.

Finally, during turn-off, the time required for clearing of minority carriers from the base of transistor 12 is reduced by the effect of the proportional base-drive circuit. The quantity of minority carriers present in the base-emitter junction is a function of the amount of base-current overdrive which is applied to the transistor. Minimizing the overdrive will effect a reduction in the quantity of minority carriers stored in the base region due to overdrive and will therefore aid in reducing the turn-off time of transistor 12.

Current Limiter

Diodes 26 and 27, and resistor 28, comprise the elements of a simple current-limiting circuit which prevents excessive collector current and excessive power dissipation in transistor 12 during initial turn-on, inrush, or due to load faults. Current through transistor 12 is sensed by voltage drop across resistor 28. Resistor 28 is chosen to have a low value of resistance so that the voltage dropped across the resistor is a small percentage of the primary voltage. The emitter of transistor 14 is referred to the low potential side of resistor 28 to provide the lowest available potential into which base current may be diverted.

Current flow through resistor 28 causes a voltage drop to appear across the resistor. The base of transistor 14 cannot be attached directly to the top of the current sense resistor since to do so would prevent turn-off pulses from transformer 15 being effective. Thus, diode 27 is employed to couple the current sense voltage to the base of transistor 14, thereby providing isolation of the current sense and turn-off pulse circuitry except when over-current conditions occur. Diode 26 serves as a low, fixed-voltage bias source to offset the voltage drop across diode 27. Since the diodes are of similar material, approximate temperature compensation is also effected by this arrangement.

During overcurrent conditions, the voltage developed across current sense resistor 28 increases to the point that the base-emitter threshold voltage of transistor 14 is exceeded, causing base current to flow into the base of transistor 14. While base current of sufficient amplitude is flowing, the collector of transistor 14 sinks a portion of the current which flows through the junction of the collector of transistor 14 and the base of transistor 12, thereby diverting base drive away from the main power switch, transistor 12. As transistor 12 pulls out of saturation, primary current is diverted into capacitor 32 which continues current flow through the current sense resistor 28 insuring that base current continues to be diverted away from transistor 12 through transistor 14. Simultaneously the loss of current flow through transistor 12 reduces the base drive available through the proportional base drive circuitry, thereby causing the turn-off to proceed regeneratively. To a lesser degree, turn-off is also assisted by the regenerative coupling through transformer windings 107/108 of transformer 11.

Diode 26 is required to be a slow-recovery type device having a recovery time of several microseconds in order to maintain its forward voltage drop after collector current stops flowing in transistor 12. In general, the recovery time of the diode will be sufficient if it is significantly slower than the combined delay plus fall time of transistor 12. This requirement is met by the Motorola MR 750 family of devices.

Snubber Circuit

For the direct-rectified, line-operated power supply which is frequently employed for blocking oscillator based switching mode power supplies, it is required that the voltage seen by the collector to emitter junction of transistor 12 be restrained to approximately 600 volts, a voltage which is within the breakdown voltage capability of existing devices. Since the input line bus can be as high as approximately 400 volts, it is in turn mandated that the flyback voltage be under approximately 200 volts.

As described generally above, control of the output voltage from the secondaries of the supply is accomplished by means of controlling the ON time of transistor 12. This, in turn, is controlled by means of removing base drive to the transistor at the precise point required to maintain equalibrium at the output for any given load and line condition. From analysis of the circuit as previously described that the turn-off of transistor 12 occurs at the point when its collector current is a maximum for the cycle.

At the time of turn-off of transistor 12, current flowing in the primary of transformer 11 has caused energy to be stored in the magnetic field of the transformer. When transistor 12 turns off, the magnetic field begins to collapse causing current to continue flowing in the primary circuit. If it is attempted to turn-off transistor 12 without assistance, the high primary current continues to flow as the transistor pulls out of saturation causing the collector to emitter voltage to increase. As the collector to emitter voltage increases toward the 500 volt level the product of current and voltage become extremely high and, absent control will quickly exceed the transistor's safe operating area characteristics, i.e. those contours of acceptable voltage/current products which characterize all semiconductor devices. In general, the safe operating area is contained within the contour of constant, maximum power dissipation for the device, but for voltages which are appreciable fractions of the maximum collector-to-emitter voltages, safe operating area characteristics are much less than the maximum dissipation rating of the device.

Operation within the safe operating area is assured by providing an alternative path for current to flow during turn-off through capacitor 32 and resistor 33. These two components perform the function of the classical "snubber" a colloquial term for components which suppress the rate of rise of voltage from the primary of transformer 11 to allow the power transistor to turn-of without exceeding its safe operating characteristics.

The conventional arrangement of snubber components is across the primary of the transformer. Due to the large current spikes which occur during turn-on however, the location of the snubber across the primary generally produces large area current loops which have adverse consequences from the standpoint of electromagnetic interference. For this reason, snubbers, are sometimes connected from the switched end of the primary to ground, in which configuration the capacitor is connected in series with a diode which is paralleled by a resistor.

The present invention provides for an improvement in the operation of the snubber by returning its midpoint to the emitter of the main power switch, transistor 12, by means of diode 34, and by returning the other side of the resistor to the cathode of didoe 26.

Various other configurations can be employed giving some of the advantages to be described in the following sections, although the embodiment now to be described is preferred over the others, especially for the specific operating voltages described in the example.

In the preferred embodiment, diode 34 isolates capacitor 32 from transistor 12's collector so that its presence does not adversely effect turn-on of transistor 12. Resistor 33 provides for discharge of capacitor 32 when transistor 12 is in the ON condition.

The new circuit arrangement has several advantages. First, since the current which is diverted by capacitor 32 upon turn-off of transistor 12 flows into diode 26 in the emitter circuit of transistor 12, transistor 12 is firmly reverse biased, causing the most rapid possible turn-off. This results because the collector of transistor 14 is essentially clamped to the return, thus clamping the base of transistor 12 to the return, while at the same time current flow through diode 26 and resistor 28 due to the charging of capacitor 32 provides a stiff voltage source to maintain the emitter at a potential above the return voltage. Since diode 26 is a slow-recovery diode, it operates as a bias source even after charge of capacitor 32 is completed thus assuring complete turn-off of transistor 12. Second, during turn-on of transistor 12, the discharge of capacitor 32 causes current to flow in diode 26, again establishing the diode as a bias source to ensure clean turn-off of the transistor.

It has been conventional to connect the snubber to the return, in the arrangement earlier described and to employ proportional base drive in accordance with the principles described above. However, it has not been known heretofore to use both concepts concurrently due to the fact that the conventionally connected snubber causes current flow in the collector circuit which interferes with the normal operation of the circuit.

The present invention recognizes this difficulty and avoids it by placing the snubber components outside of the loop through which the primary current for the proportional base drive transformer flows. Thus, during turn-off of transistor 12, the current flow through the capacitor is outside of the current transformer 13 primary loop. If placed conventionally, directly at the collector of transistor 12, current flow into capacitor 32 would instead flow through the primary of transformer 13 producing additional base drive current at the secondary of the transformer at the very instant that it is desired to terminate current flow into the base, delaying turn-off of transistor 12 and causing excessive power dissipation to occur with consequent loss of efficiency.

Figures 3, 4, 5:
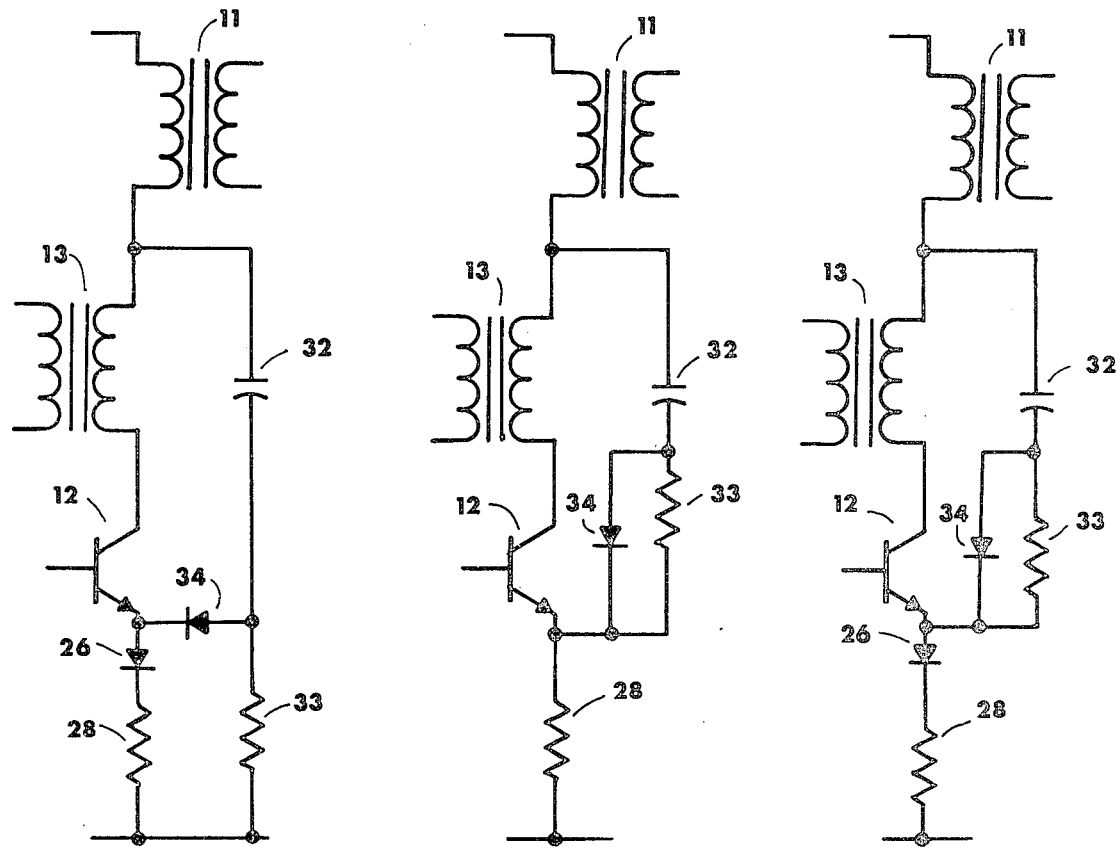
FIG. 3 is a simplified schematic diagram of another connection of the snubber circuitry components in which the result is connected to the power supply return.
FIG. 4 is a simplified schematic diagram of another connection of the snubber circuitry components in which the bias diode is eliminated.
FIG. 5 is a simplified schematic diagram of another connection of the snubber circuitry components in which the resistor and capacitor are connected to the anode of the bias diode.

FIG. 3, FIG. 4 and FIG. 5 show other arrangements of the snubber circuit of the present invention. In FIG. 3, the configuration is similar to that of FIG. 1, but the resistor 34 is returned to the power supply return instead of to the cathode of diode 26. This configuration is better than the conventional prior art connection but is inferior to the preferred embodiment since current flow due to discharge of capacitor 32 during turn-on of transistor 12 is not utilized to maintain a stable voltage across bias diode 26.

In FIG. 4, a configuration wherein the bias diode 26 is not included shows the snubber components returned to the emitter of transistor 12. This configuration has an advantage over the conventional prior art connection to the power supply return in that it does not cause the snubber capacitor 32 current to flow in the emitter sense resistor 28 during turn-on of transistor 12, and does result in current flow into the sense resistor at the time of turn-off of transistor 12, a desirable objective from the standpoint of assuring reliable turn-off. This configuration will be preferred in those designs which are intended for operation from a low voltage DC source and in which the presence of the bias diode would cause an appreciable percentage of the primary voltage, and consequently an appreciable percentage of the primary power, to be lost in the diodes' forward voltage drop.

In FIG. 5, still another configuration of the snubber is shown in which the snubber diode 34 and the snubber resistor 33 are returned directly to the emitter of transistor 12 and the anode of the bias diode 26. This configuration has desirable turn-off characteristics, but because current flow in the bias-diode 26 does not occur during turn-on, the voltage across bias diode 26 collapses and must be re-established upon the next on-time by current flow through transistor 12. Until the voltage drop across diode 26 is established, the turn-on characteristics of transistor 12 are unpredictable but in general slower than with the diode fully biased. More importantly, the current-limit point of the entire primary curret-limiter circuit is both unpredictable and, in general, higher than its design nominal.

In all of the configurations shown, the current sense resistor value can of course be in the limiting case zero resistance, assuming that the current sense requirement can be dispensed with.

For the reasons set forth previously, all of the configurations described require that the proportional base drive circuit be outside the current loop which flows through capacitor 32 during turn-off of transistor 12. Thus, the use of proportional drive for the base drive to transistor 12 virtually requires that the snubber be connected as shown in the preferred embodiments, and absent this configuration use of the proportional base drive scheme would be impractical if not impossible.

It will be apparent to those skilled in the art that variations of the above described invention, in addition to those of the preferred embodiment described, may be practiced within the principles taught and without departure from the scope of the invention, which scope is set forth in the following claims:

What is claimed is:

1. A switching mode, regulated power supply of the self-oscillating type wherein energy stored in the primary inductance of a transformer is delivered to the load during the flyback period of a cycle, for converting power from a direct-current source, which may be unregulated, into regulated direct current, at stabilized, selected voltage levels, comprising:

a first transistor;
a first transformer having a primary winding and at least one secondary winding, the first end of the primary winding being connected to the direct current source;
a first resistor the first end of which in connected to the emitter of the first transistor, the second end of which is connected to the direct current source return;
a first capacitor the first end of which is connected to the second end of the first transformer's primary winding;
a first diode the first terminal of which is connected to the second terminal of the capacitor, the second terminal of which is connected to the junction of the emitter of the first transistor and the first end of the first resistor such that current flow through the capacitor will flow through the diode during the flyback period;
a second resistor the first end of which is connected to the junction of the first capacitor and the first diode, the second end of which is connected to the first end of the first resistor;

first control means for controlling the turn-off of the first transistor in response to a command signal;
means for initiating current flow in the base of the first transistor at the beginning of each cycle and for maintaining said current flow until terminated by the first control means in response to a command;
means for rectifying the voltages produced during flyback of the primary of the first transformer;
means for sensing the rectified voltages and for generating an error signal which is proportional to the difference in the rectified secondary voltages and a stable reference voltage;
means for generating a command signal in response to the error signal such that the first control means terminates base current flow in the first transistor at the correct time to control the primary current build-up in the primary of the first transformer so that the energy delivered to the secondary with each pulse is similarly controlled, thereby regulating the output voltage.

2. The apparatus of claim 1 wherein the first control means is a second transistor the emitter of which is connected to the return of the direct current source, the collector of which is connected to the base of the first transistor, and the base of which is connected to and is responsive to the means for generating a command signal.

3. The apparatus of claim 1 or claim 2 in which a second diode is inserted in series with the first transistor's emitter and the first end of the first resistor, the first terminal of the diode being connected to the emitter and to the second terminal of the first diode and the first terminal of the first resistor, the second terminal being connected to the first resistor such that current flow in the normal direction through the emitter will forward bias the diode.

4. The apparatus of claim 3 wherein the second diode is a slow-recovery type having a recovery time in excess of the turn-off time of the first transistor.

5. The apparatus of claim 3 wherein the second terminal of the second resistor is connected to the junction of the first end of the first resistor and the second terminal of the second diode.

6. The apparatus of claim 3 further comprising:
a second transformer having a primary and a secondary, having the primary connected to the junction of the second end of the primary of the first transformer with the first capacitor and the collector of the first transistor, and having the first end of the secondary winding connected to a voltage source which is at or between the potentials of the first transistor's base-emitter voltage and the direct current source return;
a third diode, the second terminal of which is connected to the base of the first transistor, the first terminal of which is connected to the second end of the secondary winding of the second transformer such that current flow in the primary winding produces current flow in the secondary winding through the diode and the base-emitter junction of the first transistor.

7. The apparatus of claim 3 wherein the second terminal of the second resistor is connected to the junction of the first end of the first resistor and the second terminal of the second diode.

8. The apparatus of claim 4 further comprising:

a second transformer having a primary and a secondary, having the primary connected to the junction of the second end of the primary of the first transformer with the frist capacitor and the collector of the first transistor, and having the first end of the secondary winding connected to a voltage source which is at or between the potentials of the first transistor's base-emitter voltage and the direct current source return;

a third diode, the second terminal of which is connected to the base of the first transistor, the first terminal of which is connected to the second end of the secondary winding of the second transformer such that current flow in the primary winding produces current flow in the secondary winding through the diode and the base-emitter junction of the first transistor.

9. The apparatus of claim 5 further comprising:

a second transformer having a primary and a secondary, having the primary connected to the junction of the second end of the primary of the first transformer with the first capacitor and the collector of the first transistor, and having the first end of the secondary winding connected to a voltage source which is at or between the potentials of the first transistor's base-emitter voltage and the direct current source return;

a third diode, the second terminal of which is connected to the base of the first transistor, the first terminal of which is connected to the second end of the secondary winding of the second transformer such that current flow in the primary winding produces current flow in the secondary winding through the diode and the base-emitter junction of the first transistor.

10. The apparatus of claim 7 further comprising:

a second transformer having a primary and a secondary, having the primary connected to the junction of the second end of the primary of the first transformer with the first capacitor and the collector of the first transistor, and having the first end of the secondary winding connected to a voltage source which is at or between the potentials of the first transistor's base-emitter voltage and the direct current source return;

a third diode, the second terminal of which is connected to the base of the first transistor, the first terminal of which is connected to the second end of the secondary winding of the second transformer such that current flow in the primary winding produces current flow in the secondary winding through the diode and the base-emitter junction of the first transistor.

* * * * *